United States Patent [19]
Barrera et al.

[11] Patent Number: 6,132,695
[45] Date of Patent: Oct. 17, 2000

[54] SUPPORTED METAL ALLOY CATALYSTS

[75] Inventors: Joseph Barrera, Albuquerque, N. Mex.; David C. Smith, Santa Clara, Calif.

[73] Assignee: The Regents of the University of California, Los Alamos, N. Mex.

[21] Appl. No.: 09/086,995

[22] Filed: May 29, 1998

[51] Int. Cl.[7] .............................. B01J 21/18; C01C 3/08
[52] U.S. Cl. ....................... 423/371; 502/174; 585/420; 585/700
[58] Field of Search .............................. 423/371; 502/174

[56] References Cited

U.S. PATENT DOCUMENTS 3,745,209  7/1973  Middlehoek .......................... 423/371
3,872,136  3/1975  Middelhoek .......................... 423/371

FOREIGN PATENT DOCUMENTS 0038632  10/1981  European Pat. Off. .............. 423/371
61-261204 11/1986  Japan .................................... 423/371

OTHER PUBLICATIONS

Bonnefond et al, "Metalorganic Chemical Vapor Deposition of Vanadium Carbonitride", *Adv. Sci. Technol.* (1995), 5 (Advances in Inorganic Films and Coatings), 207–214 (Abstract only).

*Primary Examiner*—Wayne Langel
*Attorney, Agent, or Firm*—Bruce H. Cottrell

[57] ABSTRACT

A process of preparing a Group IV, V, or VI metal carbonitride including reacting a Group IV, V, or VI metal amide complex with ammonia to obtain an intermediate product; and, heating the intermediate product to temperatures and for times sufficient to form a Group IV, V, or VI metal carbonitride is provided together with the product of the process and a process of reforming an n-alkane by use of the product.

5 Claims, 3 Drawing Sheets

SUPPORTED METAL ALLOY CATALYSTS

FIELD OF THE INVENTION

The present invention relates to catalysis and more particularly to supported metal alloyed catalysts. This invention is the result of a contract with the Department of Energy (Contract No. W-7405-ENG-36).

BACKGROUND OF THE INVENTION

In 1995, aromatic hydrocarbons accounted for seven of the top thirty chemicals produced in the United States. For example, the production of benzene has grown by 5.5% over the past decade, and 16 billion pounds were produced in 1995. In addition, the total production of the other aromatic chemicals, ethylbenzene, styrene, toluene, xylenes, and cumene, exceeded 53 billion pounds in 1995. Although these chemicals are inherently found in base crude, the majority are produced in petro-chemical refineries from the conversion of saturated hydrocarbons, light naptha, by various catalytic processes. The present catalysts used in this process are based upon platinum, while an older technology was usually based upon chromia-alumina.

The elements of carbon, nitrogen, or oxygen interstitially dissolved into the lattice structure of early transition metals produce a class of materials with unique physical and chemical properties. The present interest in these materials originates from the ability of these alloys to catalyze significant industrial processes that are presently dominated by the rare and expensive Group VIII noble metals, that is, platinum, palladium, and rhodium. For example, an oxygen modified molybdenum carbide material catalytically isomerizes and reforms n-heptane. The conversion efficiencies were approximately 30% with 85% selectivity to $C_7$ isomers. Such a process is extremely important for the production of high-octane fuels, that is, conversion of naptha to lighter, branched hydrocarbons such as methylhexanes, dimethylpentanes, and isobutane, in the refining industry. In addition, molybdenum nitrides are known to exhibit other very attractive catalytic properties such as ammonia synthesis, hydrodenitrogenation, hydrodesulfurization, and hydrogenation. For many of the processes the catalytic activity of these materials is comparable to the Group VIII metal catalysts. Tungsten carbides are known to isomerize straight chain hydrocarbons such as n-heptane to branched hydrocarbons as well.

Originally, these alloyed materials were prepared from the corresponding metal oxides by way of a high temperature, solid-state process. The resulting materials were very low surface areas, in the range of 1–5 square meters per gram ($m^2/g$). As a result, the catalytic efficiencies of these early materials were severely limited. Several years later, the introduction of a modified solid-state process, temperature programmed reaction, overcame this problem. In the case of nitrides, the reaction temperature of the metal oxide is slowly increased in a flow of ammonia. Materials with surface areas greater than 200 $m^2/g$ have been prepared with this technique. As expected, many of these materials exhibit catalytic activities comparable to that of platinum based materials. However, on alumina supports, metal contents of at least 15 weight percent are usually required to achieve these catalytic activities compared to 0.5 weight percent of the Group VIII noble metals to achieve similar catalytic activities. This suggests that the majority of the metal species at the surface are not catalytically active. Other synthetic attempts were made to improve the inherent catalytic nature of these materials. These included self-propagating high temperature synthesis, and metal vapor impregnation of high surface area carbon.

A second disadvantage to the solid-state synthesis is the significant oxygen content in the materials. This is due to the greater thermodynamic stability of the initial oxide relative to both the nitride and carbide. Although in some instances this may be a advantage due to the Bronsted acid properties of the oxygen sites, the amount of oxygen in the material cannot be strictly controlled.

One object of the present invention is the development of new synthetic processes for the preparation of high surface area, Group VI alloys such as molybdenum carbonitride catalysts.

Another object of the present invention is a low temperature process, i.e., temperatures of less than about 500° C., e.g., 200° C. to 500° C., for the preparation of high surface area, molybdenum carbonitride catalysts.

Still another object of the present invention is a resultant catalyst from the new process having a measurable increase, e.g., a 5 to 8 fold increase, in catalytic activity over catalyst materials prepared by traditional solid state approaches.

SUMMARY OF THE INVENTION

To achieve the foregoing and other objects, and in accordance with the purposes of the present invention, as embodied and broadly described herein, the present invention provides a process of preparing a Group IV, V or VI metal carbonitride including reacting a Group IV, V or VI metal amide complex with ammonia to obtain an intermediate product; and, heating the intermediate product to temperatures and for times sufficient to form a Group IV, V or VI metal carbonitride.

The present invention further provides a Group IV, V or VI metal carbonitride product formed by the process of preparing a Group IV, V or VI metal carbonitride including reacting a Group IV, V or VI metal amide complex with ammonia to obtain an intermediate product; and, heating the intermediate product to temperatures and for times sufficient to form a Group IV, V or VI metal carbonitride.

The present invention still further provides a process for reforming an n-alkane including passing a gaseous stream of an n-alkane over a Group IV, V or VI metal carbonitride in combination with alumina support material at temperatures and for time sufficient for reforming of the n-alkane, the Group IV, V or VI metal carbonitride prepared by reacting a Group IV, V or VI metal amide complex with ammonia to obtain an intermediate product, and heating the intermediate product to temperatures and for times sufficient to form a Group IV, V or VI metal carbonitride.

DETAILED DESCRIPTION

Figure 1:
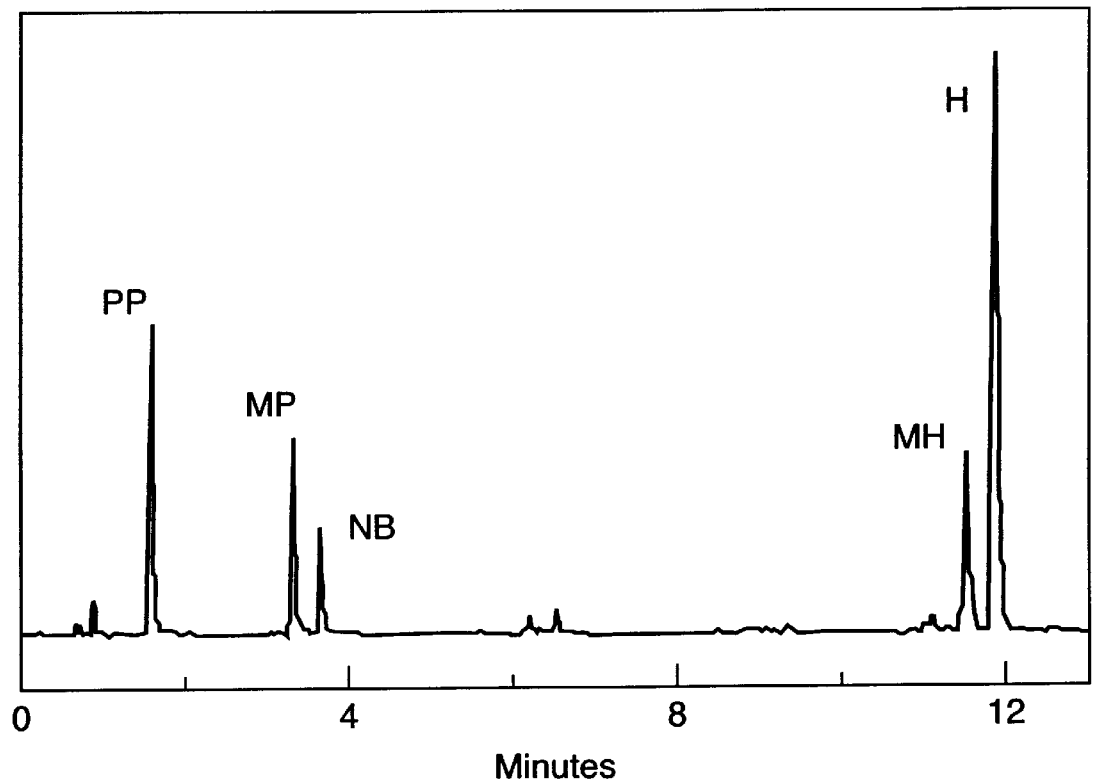
FIG. 1 shows gas chromatagraph results of products from $Mo_mC_xN_y$ on alumina pellets, under reaction conditions of 365° C., 15 sccm of hydrogen bubbled through heptane over 4 hours.

The present invention is concerned with a process for the preparation of high surface area, Group IV, V or VI metal carbonitride catalysts, such as molybdenum carbonitride catalysts, especially preparation in a low temperature process. Further, the present invention is concerned with the resultant catalysts of the process for the preparation of high surface area, Group IV, V or VI metal carbonitride catalysts, such as molybdenum carbonitride catalysts.

The Group IV, V or VI metal carbonitride catalysts products of the present process can be in combination with a suitable support material. Among suitable support materials can be alumina or cordierite (a magnesium aluminosilicate mineral) and may include carbon or silica. Alumina is preferred as the support material. In some instances, a passivating layer may be disposed upon the support material. Such a passivating layer may be a ceramic silicon carbide or the like. The support material can be in the form of powder or can be in the form of pellets.

The Group IV, V, and VI metals include molybdenum, tungsten, chromium, vanadium, niobium, tantalum, titanium, zirconium and hafnium. Generally, the Group VI metals including molybdenum, tungsten and chromium are the preferred metals in forming the metal carbonitrides of the present invention.

The process of the present invention takes advantage of the known reactivity of homoleptic metal amide complexes with ammonia to yield metal amido/imido intermediates. These intermediates thermalize at low temperatures, 200° C. to 500° C., to yield high quality metal nitride and carbonitrides. The term "homoleptic" refers to a complex containing all of the same ligands. Other metal amide complexes, i.e., non-homoleptic metal amide complexes, should be equally suitable as the starting material.

Several monometallic nitrides have been previously prepared by the general process of the following equation:

$$M(NR_2)_n + NH_3 \rightarrow M(NR_2)_{n-x}(NH_2)_x \rightarrow \Delta \rightarrow M(NH_y)_z \rightarrow \Delta \rightarrow MN$$

where R is an alkyl such as methyl and the like.

Initially, our investigation focused on the addition of ammonia at 1 atmosphere (atm) to solutions of $Mo_2(Nx;1(CH_3)_2)_6$ in high boiling organic solvents such as tetradecane. The reaction temperature was increased slowly until the characteristic yellow solution containing the precursor resulted in a fine black precipitate and a clear reaction solution. Surprisingly, reaction temperatures of 140° C. and long reaction times (six to eight hours) were required to complete the transamination process.

Simultaneous thermal analysis and combustion analyses suggest that these materials were composed of approximately 15 to 18 weight percent carbon, and 2 to 3 weight percent hydrogen. In addition, the infrared spectrum contains a broad band at 3200 cm$^{-1}$. This feature was tentatively assigned as a combination several C—H stretches. Heating these materials at 350° C. for 3 hours in vacuum results in the disappearance of this infrared feature and a 20 to 30 weight percent loss. Combustion analysis indicates a remaining carbon and hydrogen content of 2–3 weight percent and 0.3 to 0.5 weight percent, respectively. X-ray diffraction (XRD) data showed no observable features for these materials. The unsputtered, Auger spectra did show an asymmetrical resonance for the carbon peak suggesting that at least some of the carbon present is graphitic. With sputtering, the carbon feature became more carbide-like. Also, nitrogen, oxygen, and molybdenum resonances were observed in the AES spectra. Further heating of these materials to temperatures above 800° C. results in an additional 10 percent weight loss at approximately 650° C. In addition, reflections assigned to crystalline $\alpha$-$Mo_2C$ and molybdenum were present in the XRD data. No evidence of a crystalline, molybdenum nitride material is observed in the XRD pattern following a final high temperature anneal at, e.g., from about 500° C. to about 600° C.

The molecular precursor, $Mo_2(N(CH_3)_2)_6$, a dimer of tris(dimethylamine) molybdenum, was dissolved in tetradecane, and the solution was used to wet the alumina pellets. These pellets had a surface area of approximately 200 m$^2$/g and a pore volume of approximately 0.7 milliliters per gram (ml/g). Unfortunately, the rather poor solubility of the precursor, about 20 milligrams per milliliter (mg/ml), limited the amount of material that could be placed within the alumina to approximately 2 weight percent. The transamination chemistry as well as the thermal anneal would further reduce the molybdenum to alumina ratio to approximately 0.9 weight percent per cycle. To compensate for these relatively low loadings, multiple wettings and annealing cycles were used to produce the final materials for testing. Catalytic evaluation of these materials demonstrated an enhancement of nearly 5 to 8-fold compared to the previously reported molybdenum nitrides based on a relative weight percentage. While not wishing to be bound by the present explanation, the greatly enhanced activity of these materials is believed most likely due to the present low temperature process of preparation, which results in a more catalytically active material. FIG. 1 shows a gas chromatograph of the products. Only five significant products are observed. They are 2-methyl and 3-methyl hexane, 2-methylpropane, propane, and butane. The production of equal quantities of the methyl hexanes is consistent with methyl shift reactions of carbenium-ion intermediates. Table 1 summarizes the isomerization activity of the molybdenum carbonitride. Isomerization data obtained for a commercial catalyst, 0.3 weight percent Pt on alumina, is provided for comparison.

TABLE 1

| | conversion efficiency (%) | isomer selectivity (%) | MH[a] | IB[a] | NB/NP[a] | PP[a] | others | toluene |
|---|---|---|---|---|---|---|---|---|
| $Mo_mC_xN_y$ –1.8% | | | | | | | | |
| T = 350° C. | 35 | 66 | 15 | 6 | 4 | 7 | 3 | — |
| T = 375° C. | 57 | 56 | 22 | 9 | 8 | 12 | 5 | — |
| Pt –0.3% | | | | | | | | |
| T = 225° C. | 15 | 73 | 11 | — | — | — | 1 | 3 |
| T = 400° C. | 58 | 72 | 34 | 2 | 3 | 2 | 2 | 9 |
| T = 440° C. | 84 | 54 | 25 | 6 | 7 | 4 | 21 | 21 |

Figure 2:
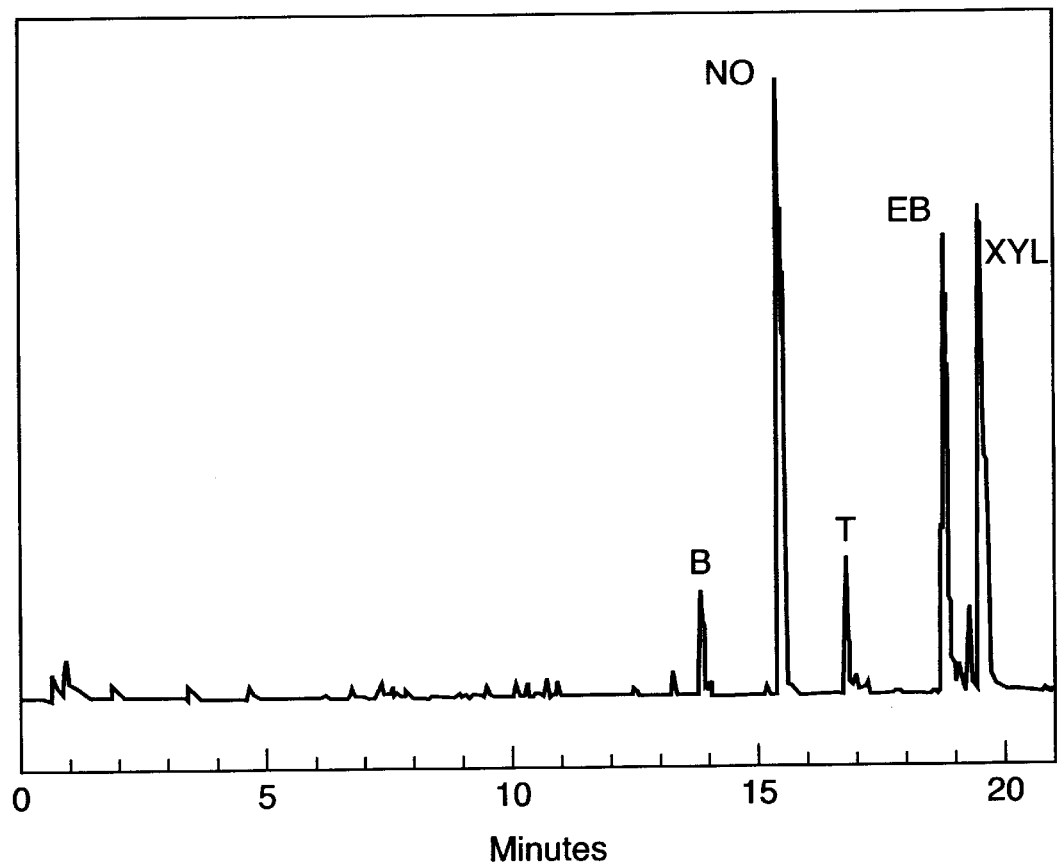
FIG. 2 shows gas chromatagraph results of products from $Mo_mC_xN_y$ on alumina pellets, under reaction conditions of 470° C., 15 sccm of (4 parts argon to 1 part hydrogen) bubbled through octane over 5 hours.
Figure 3:
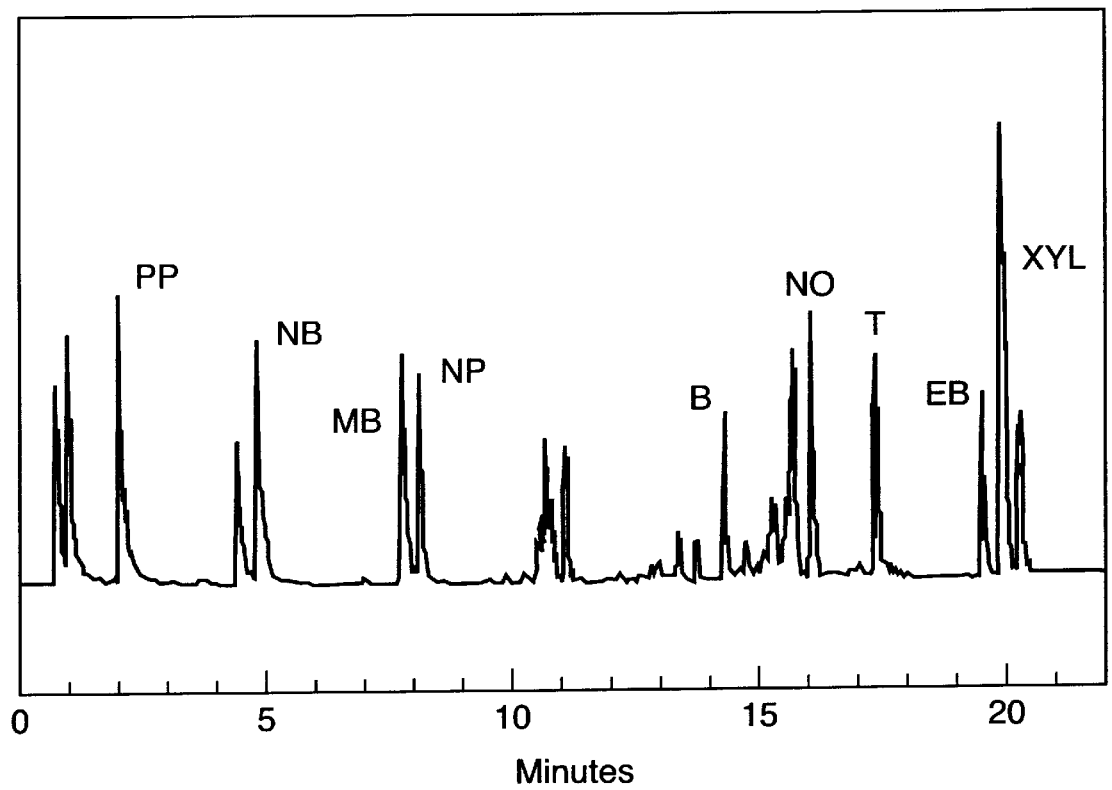
FIG. 3 shows gas chromatagraph results of the product distribution from a commercial prior art-type platinum catalytic system.

[a]MH = methylhexanes, MP = 2-methylpropane, NB/NP = normal butane and pentane, and PP = propane The molybdenum carbonitrides produced by the present organometallic, solution process becomes highly selective aromatization catalysts when alumina powder is used as a catalyst support. FIG. 2 shows a gas chromatagraph from one of the catalytic activity tests. FIG. 3 shows the product distribution of a commercial, platinum system.

The molecular precursor, $Mo_2(N(CH_3)_2)_6$, is dissolved in dodecane, and this solution is used to "wet" the catalyst support. In contrast to alumina pellets, alumina powder could absorb more of this solution for a given weight of support. Significant metal loadings could be achieved in a single cycle. A single repetition of the coating procedure results in a material composed of approximately 3.4 weight percent $Mo_mC_xN_y$ on alumina.

The present invention is more particularly described in the following examples which are intended as illustrative only, since numerous modifications and variations will be apparent to those skilled in the art.

The synthetic preparation and handling of the materials were performed in a Vacuum Atmospheres helium-filled glove box or through utilization of a standard argon Schlenk line unless specifically stated. The organic solvents used in the preparation of $Mo_2(N(CH_3)_2)_6$ were dried with appropriate drying agents, and degassed with helium or argon before use. Tetradecane and dodecane were used as received and were stored over sodium metal. Combustion analysis was performed by Oneida Research Services. Surface area measurements (BET) were collected on a Micrometrics ASAP 2000. Simultaneous thermal analyses were performed on a Rheometric STA 1500, in an argon-filled glove box. X-ray diffraction (XRD) data was collected on a Ragaku RTP 300 rotating anode diffractometer equipped with an Inel CPS 120 position sensitive detector. Auger electron spectroscopy (AES) data was performed with a PHI Model 545 and Model 548 cylindrical mirror system. Typical conditions for AES were 5 KeV energy electrons and less than 1 microamperes ($\mu$A) total beam current in a 5 $\mu$m diameter spot size. Sample sputtering was done using 3.5 KeV argon ions in a 2 millimeter (mm) by 2 mm raster area. Gas analysis was performed with a BP 5890 gas chromatograph equipped with a Gas Pro GSC 9408-04 capillary column and either a flame ionization detector (FID) or HP 5971 mass selective detector. The 0.3 weight percent platinum on alumina, and the alumina supports were supplied by Akzo-Nobel. The platinum catalyst was reduced in a 20 standard cubic centimeters (sccm) flow of hydrogen at 450° C. for 6 hours before evaluation. The alumina supports were calcined at 500° C. for 24 hours before use.

The reactor used for catalytic activity measurements consisted of a 12 mm outer diameter vertical, quartz tube furnace. This tube was connected to a gas manifold that supplied the hydrogen and argon gas flows. The flows were controlled by calibrated mass flow controllers. This gas stream had a combined flow of 15 sccm and was introduced through the normal hydrocarbon with a fine glass bubbling frit. The gas mixture was then introduced into the reactor containing the prepared materials at the operating temperatures.

EXAMPLE 1

Synthesis of molybdenum carbonitide on alumina powder. In a glove box, $Mo_2(N(CH_3)_2)_6$ (0.21 grams) was dissolved in 9 milliliters (ml) of dodecane. This solution was added slowly to the alumina (3.1 grams), and the two components were thoroughly mixed. The wetted mixture was placed loosely within a quartz tube and was contained with two plugs of quartz wool. The quartz tube was placed in a stainless steel tube with a valve at each end. The stainless steel tube served to seal the air sensitive mixture from the external environment when removed from the glove box. The system was placed in a tube furnace and ammonia was introduced at 1 atmosphere (atm). The tube was slowly heated to 80° C. and this temperature was maintained for 4 hours. Next, temperature was increased from 80° C. to 500° C. over 34 hours. Afterward, the system was cooled to room temperature while maintaining a slight ammonia flow. The tube was reintroduced back into the glove box, and a second 6 ml solution containing 0.12 g of $Mo_2(N(CH_3)_2)_6$ was used to wet the darkened alumina. The heating procedure was repeated. The material was cooled to room temperature, and 0.5 weight percent oxygen in nitrogen gas flow was used to passivate the material. The passivation period was 3 hours. The material was removed from the reaction tube and 1.0 g of the material was placed within the quartz reactor tube for catalytic evaluation.

EXAMPLE 2

One gram of this material was placed in a furnace. A gas stream composed of 3 sccm of hydrogen and 13 sccm of argon was bubbled through n-heptane or n-octane. The product stream was then analyzed by GC-MS and their relative percentages determined by a GC equipped with a FID. The new molybdenum carbonitride material demonstrated a 30% conversion efficiency of n-heptane to toluene and heptenes with a selectivity of greater than 97%. Table 2 shows dehydrocyclization of n-octane. This results in the formation of benzene, toluene, ethylbenzene, styrene, and o-xylene as the principal products. In both instances, isomerization and cracking products contributed to less than 3% of the reformed products. Such a high catalytic selectivity to aromatics is believed to be exceptional.

TABLE 2

(Aromatization data for $Mo_mC_xN_y$ on Alumina Powder)[a]

| Time[b] (hours) | Conversion efficiency (%) | Isomer selectivity (%) | B[c] | T[c] | EB[c] | STY[c] | XYL[c] | Others |
|---|---|---|---|---|---|---|---|---|
| 2 | 37 | 91 | 2.2 | 2.2 | 12.8 | 0.8 | 15.8 | 3.2 |
| 5 | 62 | 94 | 2.6 | 4.6 | 20.6 | 1.2 | 29.1 | 3.9 |
| 24 | 55 | 87 | 3.1 | 4.4 | 17.0 | 2.4 | 21.0 | 7.1 |
| 102 | 38 | 85 | 1.7 | 3.9 | 12.7 | 1.9 | 13.0 | 5.7 |

[a]An operating temperature of 475° C.
[b]Amount of time the catalyst was under operating conditions.
[c]B = benzene, T = toluene, EB = ethylbenzene, STY = styrene, XLY = xylenes.

The results of the examples demonstrate that highly selective, alumina supported, molybdenum carbonitrides have been prepared by solution impregnation using the metal amide, $Mo_2(N(CH_3)_2)_6$, as a molecular precursor. On the basis of relative weight percents, these materials demonstrate a 5 to 8-fold increase in catalytic activity over similar materials prepared by traditional solid-state approaches. The catalytic activity was very dependent upon the type of alumina support. Impregnation of $Mo_mC_xN_y$ into preformed alumina pellets resulted in a material that specifically isomerized n-heptane into equal maounts of 2 and 3-methylhexanes, and iso-butane. No evidence of aromatic products was observed at operating temperatures below 420° C. The product selectivity of the isomers was 56% at a n-heptane conversion efficiency of 57%. In comparison, a commercial platinum based material had a isomerization selectivity of 72% with similar conversions. Impregnation of $Mo_mC_xN_y$ into an alumina powder resulted in an extremely selective aromatization and dehydrogenation material. The products of this material consist of only aromatics, and n-heptenes with less than 2 percent isomerization or cracking products. Such a high degree of selectivity for n-heptane or n-octane is unprecedented for both the commercial platinum systems and the previously reported Group VI nitrides or carbides.

EXAMPLE 3

Synthesis of molybdenum carbonitide on alumina pellets. A similar procedure as described above in example 1 was used to coat a alumina support, however three wetting and heating cycles were used due to the decrease in pore volume of this support.

EXAMPLE 4

To investigate the catalytic activity of $Mo_mC_xN_y$ material (without a support material) annealed at 350° C., one gram of the $Mo_mC_xN_y$ material was placed in a flow reactor. A hydrogen and heptane gas stream at 20 sccm was flowed through the $Mo_mC_xN_y$ material at various bed temperatures. The product stream was analyzed by gas chromatography. Ethane was the only significant product observed in the chromatogram at bed temperatures between 250° C. to 475° C. The conversions were 17% to 20% and were independent of temperature. At a temperature of 135° C., propane was the only significant product observed at a conversion efficiency of 18%. Although the selectivity of the $Mo_mC_xN_y$ material was exceptionally high, the observed cracking activity is not interesting and the conversions efficiency are low compared to other known metalnitride and carbide materials. The surface area of this material, between 8 to 10 $m^2/g$, was surprisingly low for a material prepared by a modified sol-gel process. This may account for the low product conversion efficiency.

EXAMPLE 5

Synthesis of molybdenum carbonitide on alumina pellets with 0.3 wt % platinum.

In an attempt to increase the conversion activity of this later material, a bimetallic material was prepared by depositing the molybdenum precursor on alumina previously impregnated with reduced platinum. A similar procedure as described above in example 1 was used to coat the support. However, the support with platinum was heated initially to 450° C. in hydrogen. This bimetallic material exhibited a dramatic decrease in catalytic activity relative to both the previously evaluated molybdenum and platinum materials.

Although the present invention has been described with reference to specific details, it is not intended that such details should be regarded as limitations upon the scope of the invention, except as and to the extent that they are included in the accompanying claims.

What is claimed is:

1. A process of preparing a Group VI metal carbonitride comprising:

dissolving a Group VI metal amide complex in a high boiling organic solvent;

heating said dissolved Group VI metal amide complex in the presence of ammonia to obtain an intermediate product; and, heating the intermediate product to temperatures and for times sufficient to form a Group VI metal carbonitride.

2. The process of claim 1 wherein said high boiling organic solvent is selected from the group consisting of tetradecane and dodecane.

3. A process of preparing a Group VI metal carbonitride comprising:

reacting a Group VI metal amide complex with ammonia to obtain an intermediate product; and, heating the intermediate product to temperatures and for times sufficient to form a Group VI metal carbonitride, said Group VI metal selected from the group consisting of molybdenum, tungsten, and chromium.

4. The process of claim 3 wherein the Group VI metal is molybdenum.

5. The process of claim 3 wherein the Group VI metal is tungsten.

* * * * *